US 6,735,931 B1

(12) United States Patent
Blakeslee et al.

(10) Patent No.: US 6,735,931 B1
(45) Date of Patent: May 18, 2004

(54) STUD PLATE FOR SICKLE BAR HOLD-DOWN

(75) Inventors: Edward A. Blakeslee, Ephrata, PA (US); Emmett F. Glass, Akron, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/319,355

(22) Filed: Dec. 14, 2002

(51) Int. Cl.⁷ .............................................. A01D 34/13
(52) U.S. Cl. .............................................. 56/298; 56/307
(58) Field of Search ............................... 56/307, 308, 310, 56/305, 298

(56) References Cited

U.S. PATENT DOCUMENTS

| 621,562 | A | * | 3/1899 | Giffhorn ........................ 56/305 |
| 870,358 | A | * | 11/1907 | Griffiths ........................ 56/305 |
| 2,203,982 | A | | 6/1940 | Coultas et al. ................. 56/305 |
| 3,314,222 | A | * | 4/1967 | Scranto ......................... 56/305 |
| 3,490,215 | A | | 1/1970 | Chapman et al. .............. 56/298 |
| 3,978,645 | A | | 9/1976 | Bennett et al. ................ 56/310 |
| 4,012,891 | A | | 3/1977 | Steuerwald .................... 56/305 |
| 4,387,554 | A | * | 6/1983 | Bedogni ........................ 56/296 |
| 4,519,192 | A | | 5/1985 | Oppenhuisen et al. ......... 56/298 |
| 4,894,979 | A | | 1/1990 | Lohrentz ....................... 56/305 |
| 4,909,026 | A | * | 3/1990 | Molzahn et al. ............... 56/298 |
| 6,305,154 | B1 | | 10/2001 | Yang et al. .................... 56/298 |

* cited by examiner

Primary Examiner—Thomas B. Will
Assistant Examiner—Meredith Petravick
(74) Attorney, Agent, or Firm—John William Stader; Collin A. Webb

(57) ABSTRACT

A stud plate is disclosed comprising a steel plate with two spaced-apart threaded stainless steel studs stud-welded thereto. In use, the stud plate has two forged sickle bar hold-downs attached thereto such that a nut on the studs may be selectively tightened to flex a portion of the hold-down and thus adjust the spatial relationship between the hold-down and a knife section.

3 Claims, 5 Drawing Sheets

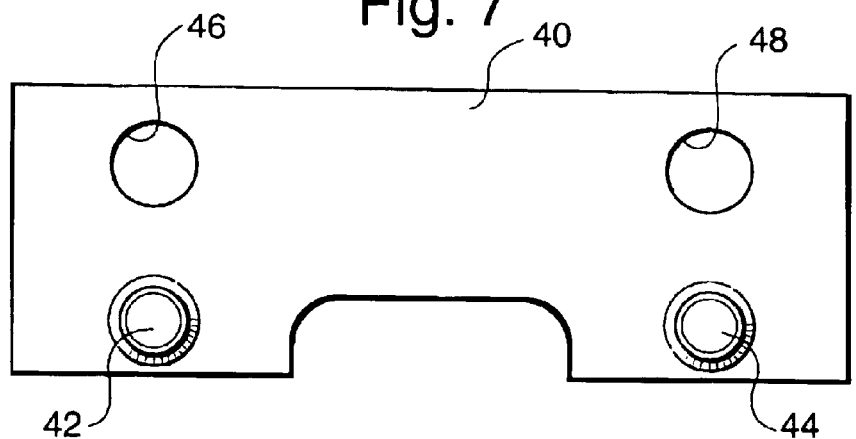
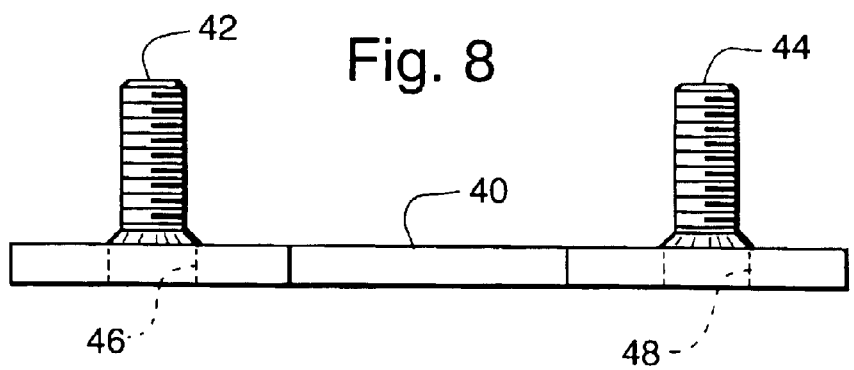
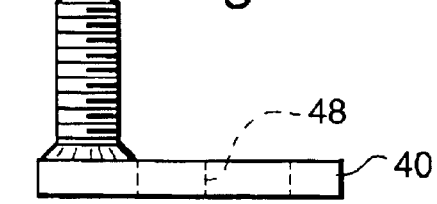
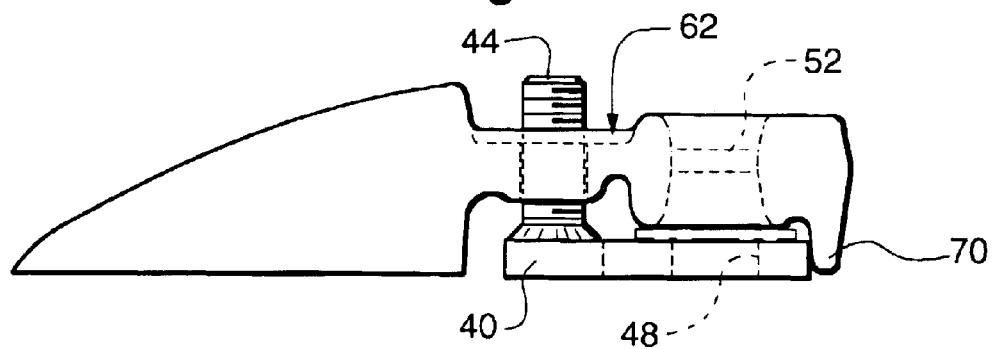

STUD PLATE FOR SICKLE BAR HOLD-DOWN

CROSS-REFERENCE TO RELATED APPLICATIONS

The invention is this application is related to those disclosed and claimed in U.S. application Ser. Nos. 10/319,292, 10/319,291 and 10/319,353 entitled, respectively, "Adjustable Hold-Down for Sickle Guards", "Mechanism for Preventing Misalignment of Hold-Downs", and "Sickle Cutterbar Assembly". All of these applications were filed on the same date as the instant application, and all have the same inventors.

BACKGROUND OF THE INVENTION

The present invention relates generally to a mowing apparatus of the reciprocating sickle type and more particularly to a stud plate for a low profile hold-down.

The general mode of operation of reciprocating sickle bar mowing apparatus is well known, as is the importance of keeping the sickle bar knife sections substantially parallel to the ledger surface on the guards, and maintaining the proper clearance between them for good shearing action. Some form of hold-down clip or plate extending over the knife sections is generally used for this purpose.

Heretofore known hold-down mechanisms, such as those shown in U.S. Pat. Nos. 3,490,215, 3,577,716, 4,012,891, 4,894,979 and 6,305,154 are widely used, but have not been entirely satisfactory. The difficulty of adjusting such mechanisms often results in mowers being operated with improper knife clearance. Too much clearance allows crop material to force the knife section away from the cutting edges of the guards, greatly reducing cutting efficiency. Too small a clearance results in drag on the sickle bar assembly and a resultant increase in wear rate and power requirements. For the older clip-type hold-downs, adjustment is generally accomplished by bending the forward portion of the hold-down clip up or down as required by means of a hammer. This method is time consuming and inconvenient and usually requires removal of the sickle bar so that the adjustment must be checked by means of a gage rather than by direct measurement with the knife in place. Some attempts at improvement of this type of hold-down clip have involved pivoting the clip in a cradle mounted on the frame member and providing screw adjusting means so that the clearance between the forward part of the clip and the sickle section can be varied.

Both the conventional hold-down clip and the screw adjusted versions are typically placed between guards where they suffer additional dual disadvantages-first, of being located so as to snag crop material divided and deflected into this area by the guards, and second, of having only an indirect effect in controlling knife clearances in that they are not directly above the guard ledger surfaces.

Other attempts at improvement have included a variety of less conventional designs including some in which the hold-down plate itself is a form of leaf spring or is spring loaded so that there is always hold-down pressure on the knife sections although, typically, means are provided for adjusting this pressure. This type of hold-down clip is in constant contact with the knife sections and the drag between them increases wear rate and the power required to operate the mowing apparatus.

In another design, the hold-down clip is centered on the guard and clamped in position with the same screw fastener that retains the guard. Typically, screw adjustment is provided to raise or lower the forward part of the clip, but before the screw adjustment can be made, the screw fastener must be loosened to permit pivoting of the hold-down clip, consequently loosening the guards and upsetting adjustment of the wear plates between the sickle bar assembly and the frame member.

It would be advantageous to reduce the complexity of the hardware and the steps necessary to make appropriate adjustments to the hold-downs of a sickle bar mower.

SUMMARY OF THE INVENTION

Accordingly, it is an object of the present invention is to provide a simple stud plate for use with a sickle bar hold-down to reduce projecting hardware while still allowing for adjustment of the spatial relationship between the hold-down and the sickle knife sections.

Another object of the present invention is to provide a stud plate for use with a sickle bar hold-down that promotes easy and reliable adjustment of the hold-down relative to the sickle knife sections.

It is another object of the instant invention to provide a stud plate for use with a forged sickle bar hold-down that has an elongated finger-like body portion with a knife section facing surface and a reduced transverse cross-sectional area at a strategic location that allows selective flexing of the finger-like body portion adequate to adjust the spatial relationship between the knife section facing surface and the sickle knife sections.

Yet another object of the present invention is to provide a stud plate for a sickle bar hold-down that promotes infinite adjustment independently of the mechanism by which the hold-down is affixed to a support structure.

It is yet another object of this invention to provide a stud plate for a sickle bar hold-down that is durable in construction, inexpensive of manufacture, carefree of maintenance, facile in assemblage, and simple and effective in use.

These and other objects are attained by providing a stud plate comprising a steel plate with two spaced-apart threaded stainless steel studs stud-welded thereto. In use, the stud plate has two forged sickle bar hold-downs attached thereto such that a nut on the studs may be selectively tightened to flex a portion of the hold-down and thus adjust the spatial relationship between the hold-down and a knife section.

DESCRIPTION OF THE DRAWINGS

The advantages of this invention will be apparent upon consideration of the following detailed disclosure of the invention, especially when taken in conjunction with the accompanying drawings wherein:

FIG. 7 is a top plan view of the stud plate element;

FIG. 8 is a front elevational view of the stud plate of FIG. 7;

FIG. 9 is an end, or side elevation of the stud plate of FIGS. 7 and 8; and

FIG. 10 is an end elevational view of the hold-down forging in place on the stud plate with a single optional shim interposed.

DESCRIPTION OF THE PREFERRED EMBODIMENT

Figure 1:
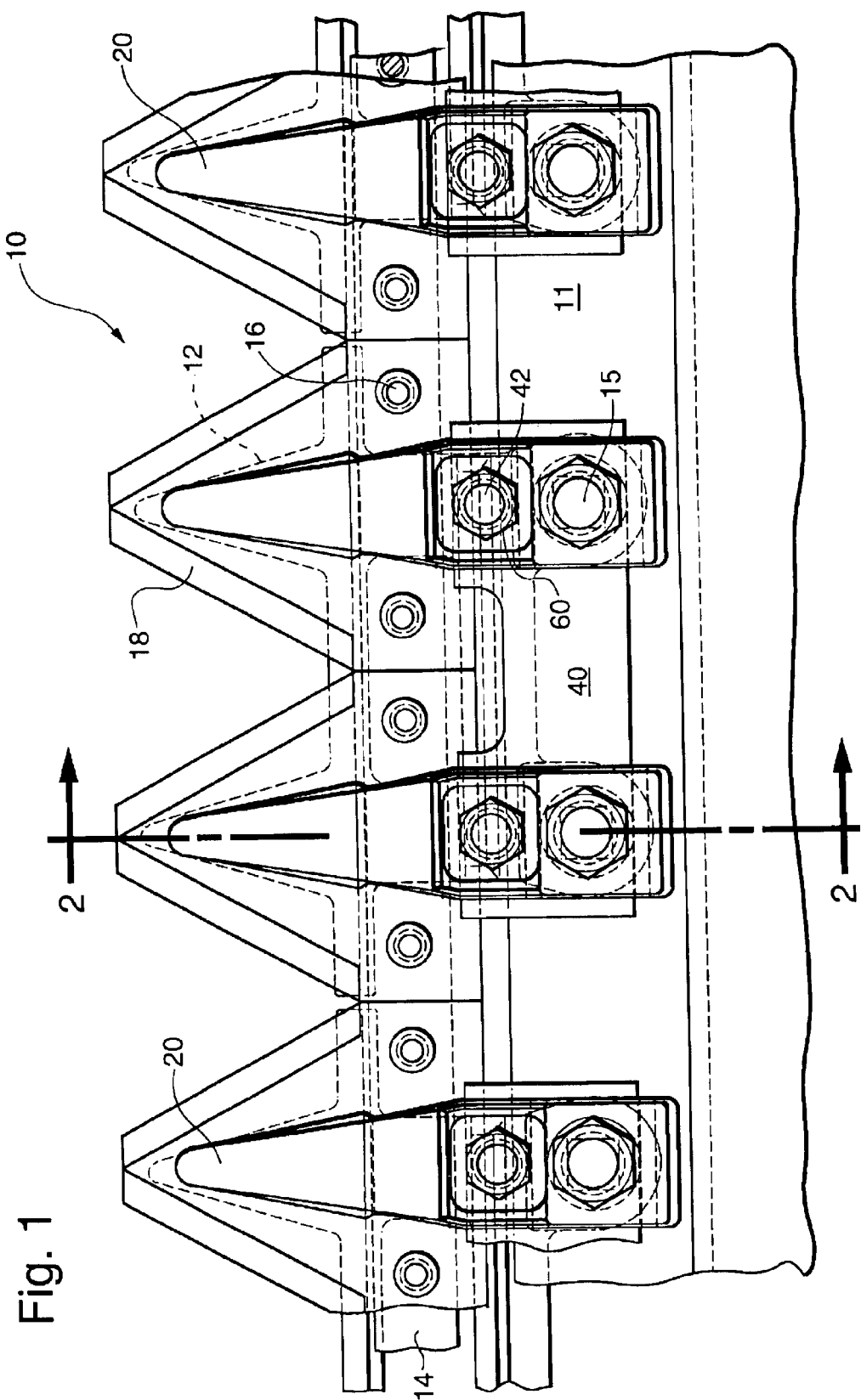
FIG. 1 is a top plan view of a fragmentary part of a cutterbar assembly showing a complete assembly of the elements of the instant invention.
Figure 2:
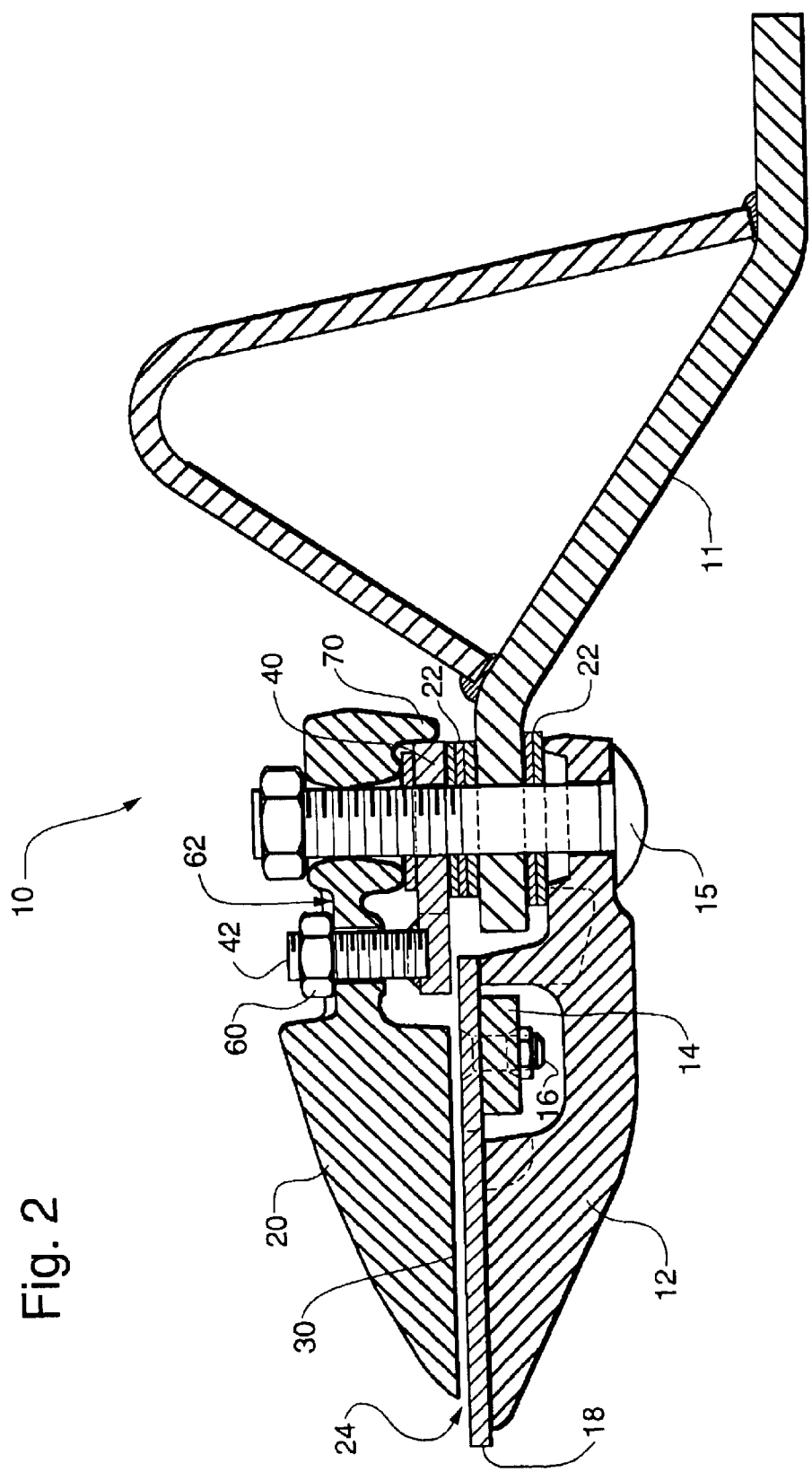
FIG. 2 is an enlarged vertical section taken along the line 2—2 of FIG. 1.

The harvester or other machine with which the hold-down of the present invention is utilized has a crop cutting mechanism, most commonly referred to as a reciprocating sickle-type "cutterbar" 10 that normally extends horizontally across the path of forward travel of the harvester. The cutterbar 10 is typically affixed to the forward lower portion of a frame structure or a fairly rigid metallic floor member 11 so as to present the cutterbar at the initial cropengaging portion of the machine. A plurality of sickle guards 12, shown in phantom in FIG. 1, are positioned regularly across the bottom of the cutterbar. An elongate knife-back 14 also extends across the cutterbar and has removably affixed thereto by bolts 16, a plurality of knife sections 18. The knife sections 18 are reciprocated lengthwise (by means, not shown, at one or both ends depending upon whether it is a single or double sickle bar cutterhead) so that the cutting edges on the knives register with the generally matching edges of the guards 12 to create a scissoring action to sever the crop material. In order to ensure that the knife sections and guards maintain the proper relationship for cutting, a plurality, one above each sickle guard, of hold-downs 20 are attached. This "sandwich" of components, along with appropriate shims 22, is held together and attached to the member 11 by fastener means in the nature of carriage bolts 15.

In all such mechanisms, the relationship between the hold-down and the knife section is critical to efficient and effective operation, and the objective in performing such adjustment is to minimize the gap 24, yet allow adequate space for the free movement of the knife sections. The hold-down of the instant invention is intended to promote easy and effective adjustment of this relationship.

Figure 3:
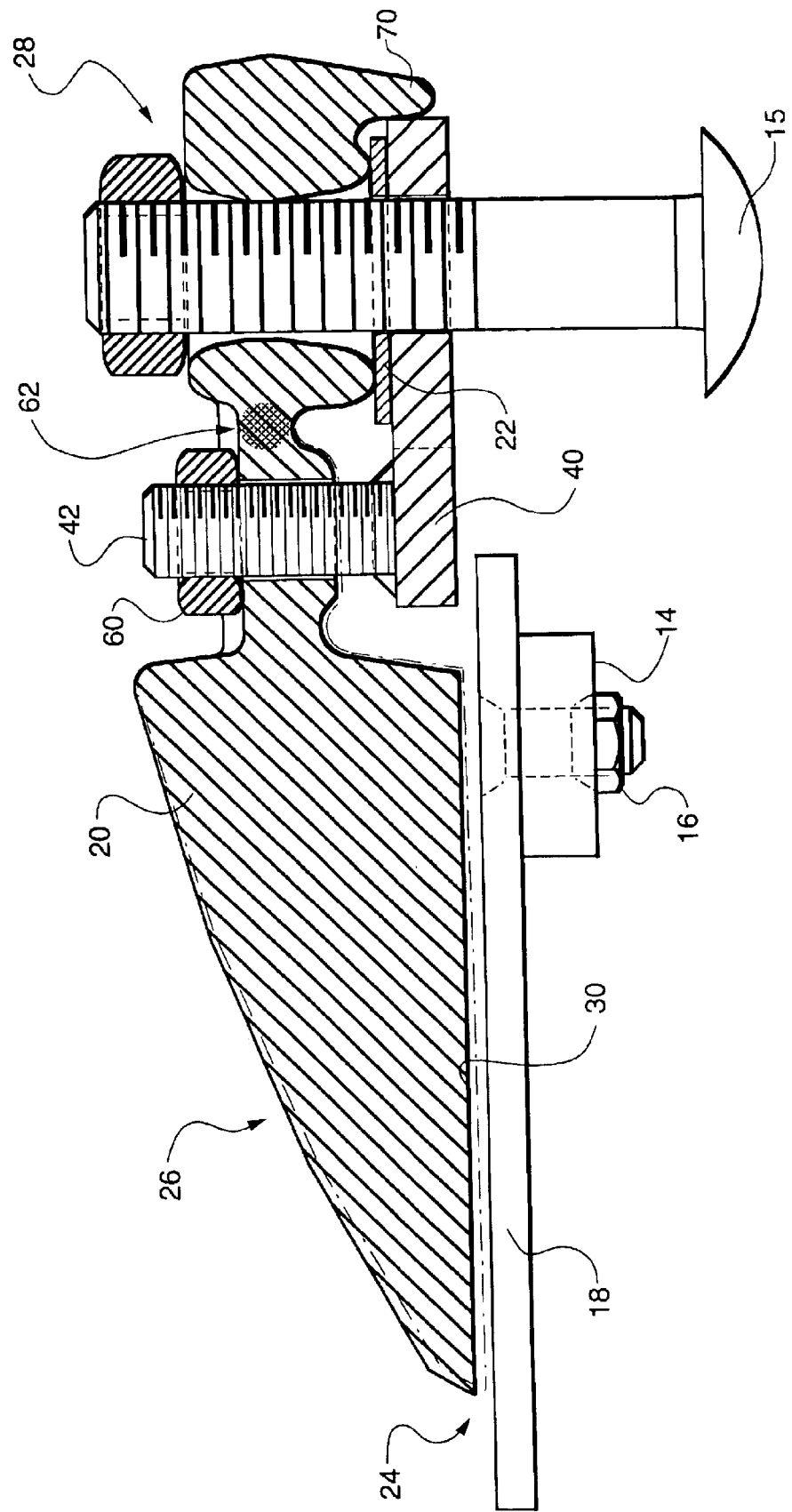
FIG. 3 is a further enlarged sectional view of certain of the parts of FIG. 2 to better illustrate the operation of key parts.
Figure 4:
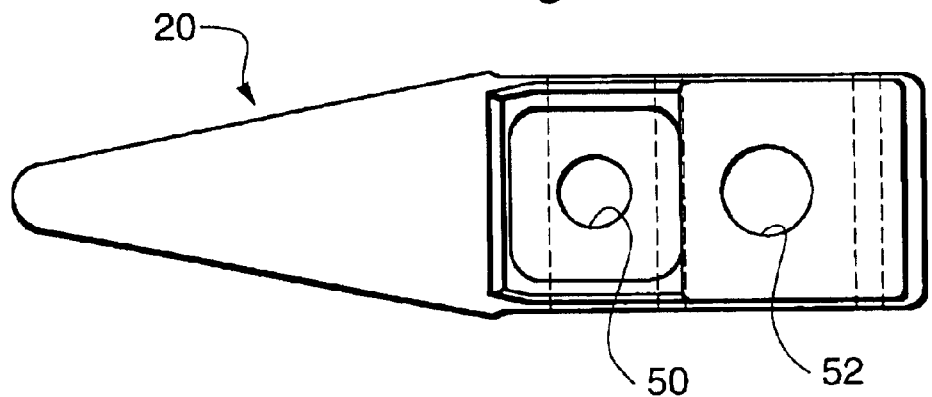
FIG. 4 is a top view of one hold-down forging, alone.
Figure 5:
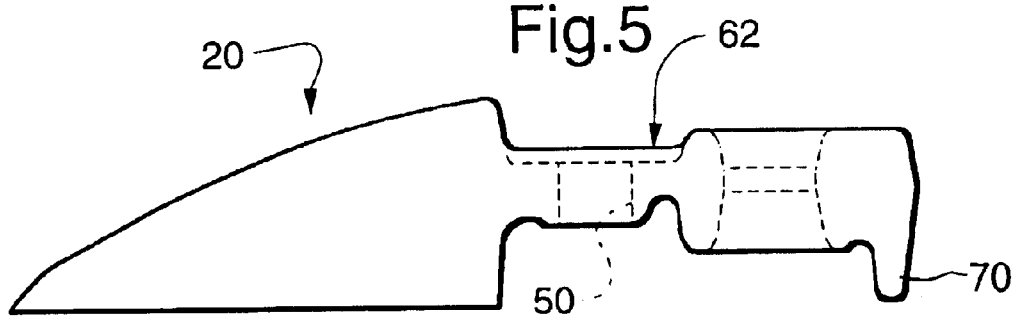
FIG. 5 is a side elevation of the forging of FIG. 4.
Figure 6:
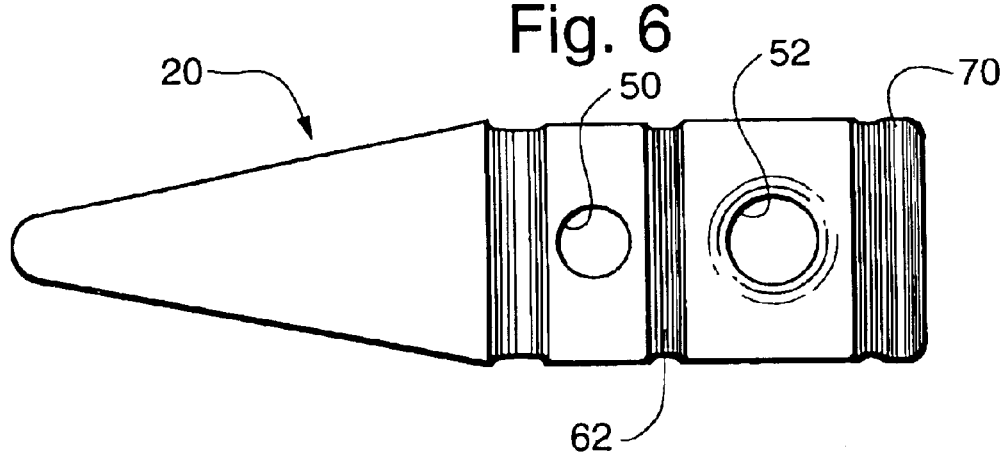
FIG. 6 is a bottom plan view of the forging of FIGS. 4 and 5.

Referring initially and broadly to FIGS. 1 and 3, the hold-down 20 is an elongate forging with a forward (in relation to the direction of travel of the harvester) finger-like portion 26 and a rear generally rectangular box-like portion 28. Referring to FIG. 3, the overall objective is to adjust the position of the lower surface 30 of front portion 26 of hold-down 20 between the fixed-line location and the dotted-line location, i.e., adjust the size of gap 24.

As best seen in FIGS. 7–10 a generally rectangular stud plate 40, comprising a flat portion of suitably rigid material such as, for example, 10B-38 steel, hardened, and two spaced-apart stainless steel studs 42 and 44 (also hardened) stud-welded thereto and two holes 46 and 48 therethrough and adjacent to the studs. The stud plate is compressed by carriage bolt 15 into the "sandwich" of components making up the cutterbar 10. The material characteristics, particularly of the flat portion, are important because of the wear to which the components are subjected. In this case, the knife sections 18 reciprocate closely adjacent the bottom of the stud plate 40, subjecting the two components to significant abrasion due to materials such as dirt and crop that move between the two. The preferred stainless steel studs do not corrode or "stick" to the nuts, and thus promote ease of adjustment.

The stud plate 40 mounts two hold-downs to the cutterbar structure 10 as shown generally in FIG. 1. Two is a convenient number of hold-downs making up this grouping, though any reasonable number could be used. Two provides what has been found to be the most expedient number for assembly and repair operations. Sometimes, however, because of the length of the cutterbar or for other reasons, single hold-downs may be used on part of the cutterhead assembly. Each hold-down 20 has a pair of holes 50 and 52 vertically therethrough similar in size and spacing to the studs and holes 42, 46 and 44, 48 of stud plate 40 so that, as shown clearly in FIG. 10 the holes 50 fit over studs 44 and the two holes 48, 52 are in alignment for the insertion of carriage bolts 15. The lower area of the rear portion 28 of each hold-down 20 has a horizontal slot-like variably formed area raised relative to the lower surface 30 of the forward portion of hold-down 20 into which the stud plate 40 is fitted. The opposing upper surface, opposite the area into which the stud plate is fitted, is lowered and variably formed to receive a nut 60 on stud 42.

In cross-section, as seen best in FIGS. 2, 3, 5, and 10, rear portion 28 of hold-down 20 includes a narrowed section 62 (specially cross-hatched for illustration purposes in FIG. 3). Narrowed section 62 is of such size and thickness as to permit a small amount of flexing of the forward portion 26 of the hold-down, in spite of the fact that the hold-down 20 is preferably a forging. With the cutterbar assembled as in FIG. 2, tightening of the nut 60 on stud 48 42 will cause flexure at section 62 and resultant pivoting of the forward portion 26 of hold-down 20 about that section, moving the lower surface 30 toward knife section 18.

This adjustment is simple to accomplish in that it merely requires the insertion of a feeler gauge into the gap and the manipulation of nut 60. There is no need to adjust or loosen other nuts and bolts, disassemble the cutterhead, or otherwise engage in complex multi-step mechanical manipulations.

The rearmost segment of the rear portion 28 includes a protruding ridge, or lip 70 extending across the rear end thereof. Lip 70 is generally perpendicular to the longitudinal axis of hold-down 20, i.e., the axis running from the point of finger-like front portion 26 through the middle of rectangular rear portion 28. Thus, in the assembled "sandwich", when lip 70 is in registry with the rear edge of stud plate 40, the front portion 26 of hold-down 20 is in proper position over the knife section 18. Lip 70 also prevents the "wiggling" of front portion 26 of hold-down 20, even if the hardware somehow becomes slightly loosened. The lip structure could be used on substantially any hold-down with or without the stud plate 40—so long as a similarly appropriate edge is provided on the underlying components.

Appropriate shims 22 should be inserted in the assembly to assure that the hold-down is initially installed in a horizontal position. It is from this horizontal position that adjustments are made to respective gaps 24 in the various assemblies.

The shape of the hold-downs shown herein are what may be referred to as a "big foot". Specifically, the "big foot" design can be identified in any of the cross-sectional views of the hold-down. Notice that there is only a very small cutout on the underside of the finger-like forward portion 26. The smaller this cutout, the less opportunity there is for crop materials to become entangled, forming what is sometimes referred to as a "mustache". These mustaches can become surprisingly long and even interfere with the cutting operation of adjacent knife sections and the flow of cut crop material to the processing components of the harvester. Other designs may be required by the hardware used to hold the knife sections and knife backs together. If the rivet heads or nuts protrude above the surface of the knife section, the hold-down will have to have a cutout of sufficient clearance to allow passage of the knife sections.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In a cutting apparatus of the reciprocating sickle type adapted for cutting standing crops and having an elongate frame member generally transverse to the direction of travel of the cutting apparatus, a plurality of sickle guards having finger portions extending forwardly from said frame member and cutting edges; said guards rigidly affixed to said frame member, and an elongated reciprocating sickle bar assembly including a plurality of knife sections with angled forwardly converging cutting edges and upper and lower surfaces, each said cutting edge intersecting with a cutting edge on the adjacent section at a rearward vertex and registering with said cutting edges of said guards as the sickle bar assembly reciprocates, a plurality of hold-downs each said hold-down comprised of an elongate body having a forward finger portion extending outwardly over said upper surfaces of said knife sections and an opposing rectangular rear portion, said rear portion having a first vertical hole therethrough adjacent the rear end thereof and a second vertical hole therethrough between said first hole and said forward finger portion, said rear portion further having a reduced cross-sectional area between said first and second holes, the improvement comprising:

a plurality of stud plates each comprising an elongate generally rectangular plate having two holes therethrough and two elongate threaded studs welded thereto and projecting away therefrom, said studs and holes spaced and aligned such that they would align with the said first and second holes though said hold-downs, with the studs projecting through said second holes, said hold downs affixed to said plurality of stud plates and rigidly affixed to said frame member by bolts extending through said first holes and said studs each having a nut thereon to tighten on said hold-downs to adjust the spatial relationship between the individual hold-downs and said upper surfaces of said knife sections.

2. The improvement of claim 1, wherein:

said plate comprises hardened 10B-38 steel.

3. The improvement of claim 2, wherein:

said studs comprise stainless steel.

* * * * *